United States Patent [19]

Wittig et al.

[11] 4,176,326
[45] Nov. 27, 1979

[54] CF$_4$ LASER

[75] Inventors: Curt Wittig, Santa Monica; Joe J. Tiee, Los Angeles, both of Calif.

[73] Assignee: The United States of America as represented by the United States Department of Energy, Washington, D.C.

[21] Appl. No.: 844,086

[22] Filed: Oct. 20, 1977

[51] Int. Cl.² ............................................. H01S 3/223
[52] U.S. Cl. ............................................. 331/94.5 G
[58] Field of Search ................... 331/94.5 G, 94.5 P; 330/4.3

[56] References Cited

U.S. PATENT DOCUMENTS

| | | | |
|---|---|---|---|
| 4,053,851 | 10/1977 | Krupke | 331/94.5 G |
| 4,063,190 | 12/1977 | Rink | 331/94.5 G |

*Primary Examiner*—William L. Sikes
*Attorney, Agent, or Firm*—Dean E. Carlson; William W. Cochran, II

[57] ABSTRACT

A CF$_4$ laser for producing near 16 μm radiation utilizing a line tunable CO$_2$ laser as an optical pumping source. The device uses a cryogenically cooled optically pumped cell containing molecular CF$_4$ gas. An optical resonant cavity formed around the optically pumped cell induces oscillations of near 16 μm radiation from the $\nu_2 + \nu_4 \rightarrow \nu_2$ transition in the molecular CF$_4$ gas.

8 Claims, 4 Drawing Figures

| | CF₄ LASER LINE (cm⁻¹) | CF₄ LASER LINE ASSIGNMENT | PUMP LASER LINE (9.6 μm BAND CO₂) | RELATIVE INTENSITY OF CF₄ OUTPUT | OPERATING PRESSURE (torr) |
|---|---|---|---|---|---|
| (1) | 653.32 | R(41) | P(10) | MS | 0.1-3 |
| (2) | 649.3±1 | R(33) | P(8) | M | 0.1-3 |
| (3) | 646.1±1 | R(27) | P(6) | MS | 0.1-3 |
| (4) | 643.23 | R(22) | R(20) | MS | 0.1-5 |
| (5) | 642.4±1 | R(20) | P(4) | MS | 0.1-3 |
| (6) | 640.73 | R(17) | R(16) | M | 0.1-2 |
| (7) | 631.15 | Q | R(22) | M | 0.2-1.5 |
| (8) | 631.05 | Q | R(18) | MS | 0.2-2 |
| (9) | 631.12 | Q | P(12) | M | 0.2-1.5 |
| (10) | 618.11 | P(25) | R(10) | MS | 0.2-5 |
| (11) | 615.06 | P(32) | R(12) | S(4mJ) | 0.2-10 |
| (12) | 611.99 | P(38) | R(14) | MS | 0.2-5 |

$CF_4$ LASER

BACKGROUND OF THE INVENTION

The present invention pertains generally to infrared lasers and more particularly to optically pumped infrared lasers.

Applications of laser photochemistry have produced a need for simple and efficient lasers for producing coherent radiation at specified wavelengths near 16 μm. Of the various methods and devices utilized for producing these specified wavelengths, including stimulated Raman scattering of selected gases and various types of solid state devices for either producing specified wavelengths or shifting frequency, such as the diode laser and various germanium substrates, respectively, the gas lasers are the most attractive candidates for providing these specified wavelengths because of their simplicity, efficiency, and scalability, in both power and repetition rate. Currently, however, conventional gas lasers, such as $CO_2$ lasers, are incapable of producing specified frequencies of interest. Although the $CO_2$ laser has been useful in producing near 16 μm radiation by the various methods disclosed above, these systems have been extremely complex with low overall efficiency, rendering these approaches somewhat impractical for uses outside the laboratory.

With the advent of optically pumped lasers, the highly developed technology of $CO_2$ lasers has been applied in an optical pumping scheme for producing transitions in another molecular gas causing inversions in the optically pumped gas at desired wavelengths near 16 μm. The problem, however, in producing such a system is selecting a gas having an absorption spectrum which falls within the operating range of a line tunable $CO_2$ laser and which, according to selection rules, inverts between quantum states to produce the desired wavelengths. Additionally, conversion gains between quantum levels must necessarily be considered to produce an optically pumped laser having sufficient gain.

SUMMARY OF THE INVENTION

The present invention overcomes the disadvantages and limitations of the prior art by providing a near 16 μm $CF_4$ laser. The $CF_4$ laser of the present invention utilizes a line tunable $CO_2$ laser as an optical pumping source for exciting the combination vibrational state $\nu_2+\nu_4$ of the molecular $CF_4$ gas which falls within the operating range of the line tunable $CO_2$ laser. An optical resonant cavity induces oscillations of coherent radiation emitted by the transition $\nu_2+\nu_4\rightarrow\nu_2$ of the $CF_4$ gas to produce a near 16 μm coherent output signal.

It is therefore an object of the present invention to provide an optically pumped $CF_4$ laser.

It is also an object of the present invention to provide an optically pumped $CF_4$ laser capable of producing near 16 μm radiation.

Another object of the present invention is to provide an optically pumped $CF_4$ laser which is simple in operation.

Another object of the present invention is to provide an optically pumped $CF_4$ laser which is efficient in operation.

Other objects, advantages, and novel features of the present invention will become apparent from the detailed description of the invention when considered in conjunction with the accompanying drawings, wherein:

DETAILED DESCRIPTION OF THE PREFERRED EMBODIMENT OF THE INVENTION

Figure 1:
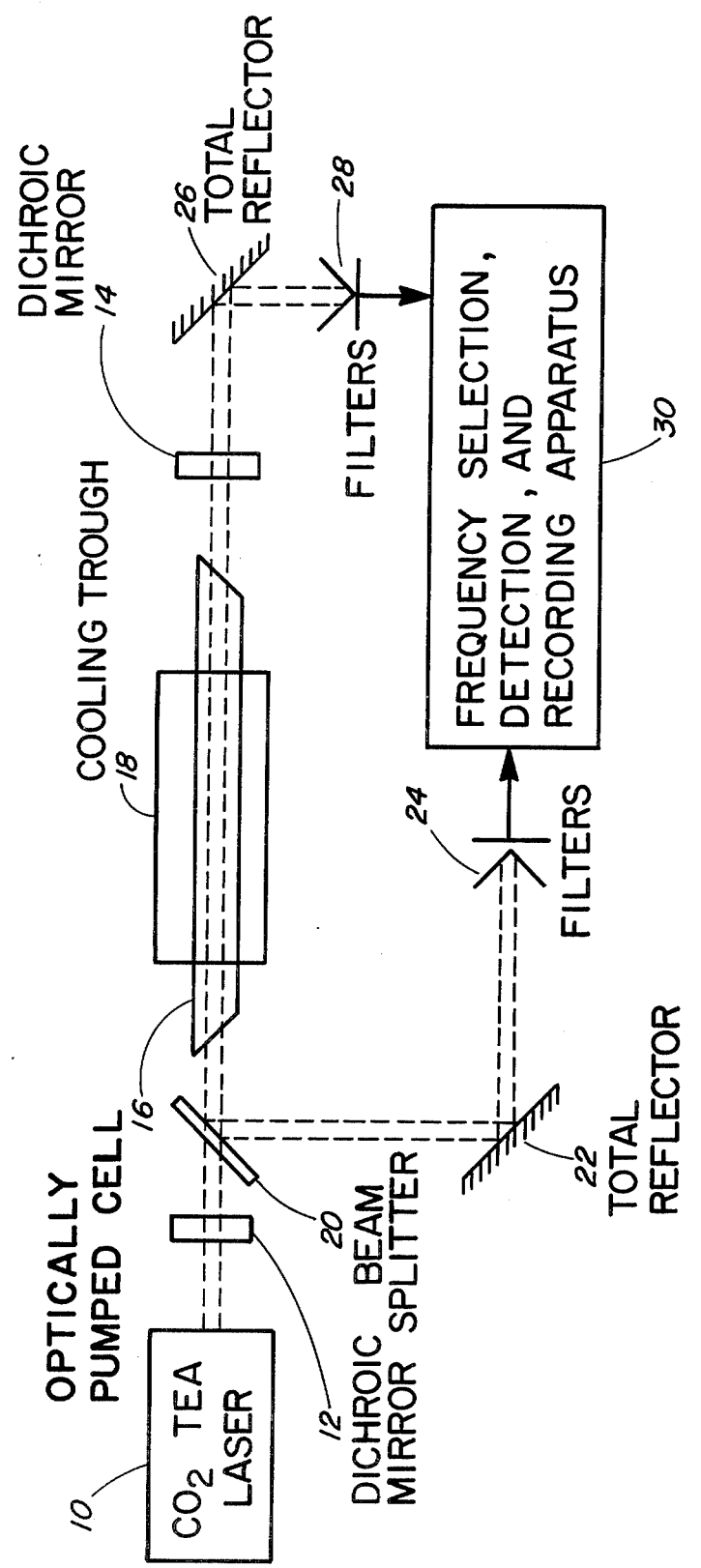
FIG. 1 is a block diagram of the apparatus of the preferred embodiment of the invention.

Referring to the drawings, wherein like reference numerals designate identical or corresponding parts throughout the several views, FIG. 1 schematically discloses the preferred embodiment of the invention. As shown in FIG. 1, a line tunable $CO_2$ TEA laser 10 is utilized as an optical pumping source. Dichroic mirrors 12 and 14 are spaced approximately 300 cm apart to form the laser optical resonant cavity. Dichroic mirror 12 is transmissive to the near 10 μm radiation produced by the $CO_2$ laser while almost totally reflective for the near 16 μm radiation produced by stimulated emission from the $CF_4$ gas. Dichroic mirror 14 is reflective to the near 10 μm radiation while partially reflective to the 16 μm radiation.

The optically pumped cell 16 is constructed of 20 mm inner-diameter pyrex tubing about 280 cm in length and is sealed at both ends with either KBr or CsI window mounted at the Brewster angle. Cooling is accomplished in cooling trough 18 by either liquid nitrogen boil off or various slushes. Cell temperatures as low as 155° K. can be obtained by the liquid nitrogen boil off technique.

The laser output is coupled from the optical resonant cavity by a beam splitter 20 to a total reflector 22 and filters 24 for frequency selection, detection and recording, as schematically shown at 30. Detection is performed by HgCdTe and Ge:Cu detectors in conjunction with a monochromator, e.g., 0.25 m Jarrell Ash or 1 m Spex. The laser output can also be detected via total reflector 26 in filters 28 in the manner schematically shown in FIG. 1.

Figure 2:
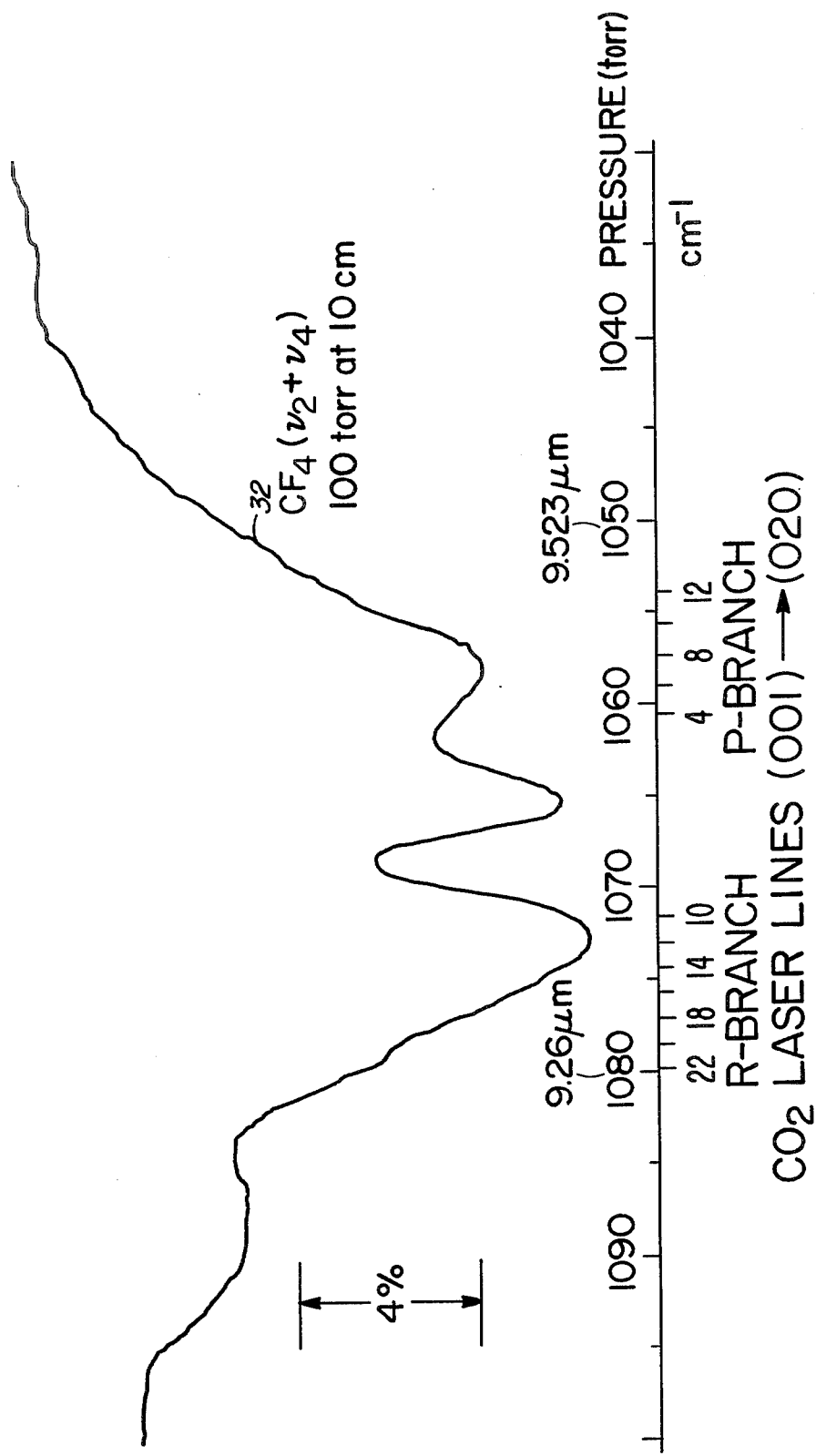
FIG. 2 is a graph of the absorption spectrum of the $\nu_2+\nu_4$ vibrational absorption spectrum of molecular $CF_4$ gas.

In operation, the line tunable $CO_2$ laser 10 produces an optical pumping signal which falls within the range of the absorption spectra of the combination vibrational states $\nu_2+\nu_4$ of the molecular $CF_4$ gas. As shown in FIG. 2, various lines of the P and R branches of the $CO_2$ laser produced by inversion from the 001 to the 020 state, fall within the $CF_4$ absorption spectrum corresponding to approximately 1050 wavenumbers (near 9.5 μm) to 1080 wavenumbers (near 9.26 μm). Experimental data confirm that (001)-(020) R(12) is absorbed most strongly at a measured absorption coefficient of $1.1\times10^{-4}$ cm$^{-1}$ torr$^{-1}$.

Since the line tunable $CO_2$ laser is capable of exciting various rotational states of the $\nu_2+\nu_4$ vibrational state of the molecular $CF_4$ gas, various frequencies can be obtained in the near 16 μm range from the transition $\nu_2+\nu_4\rightarrow\nu_2$. Selection rules determine allowable inversions and therefore wavelengths which can be produced. A summary of the $CF_4$ laser lines which have been produced, their assignments, the pumped laser lines utilized, the relative intensity of the $CF_4$ output, and the operating pressure of the $CF_4$ gas are summarized in a table shown in FIG. 3. As is clear from the table, $CF_4$ laser emissions from approximately 653 cm$^{-1}$ to 612 cm$^{-1}$ are obtained as the $CO_2$ laser is tuned from the P(12) to the R(22) line. The relative intensities shown range from strong, to medium strong, to medium by a ratio of 9:3:1, where strong is approximately 4 mJ.

Figures 3, 4:
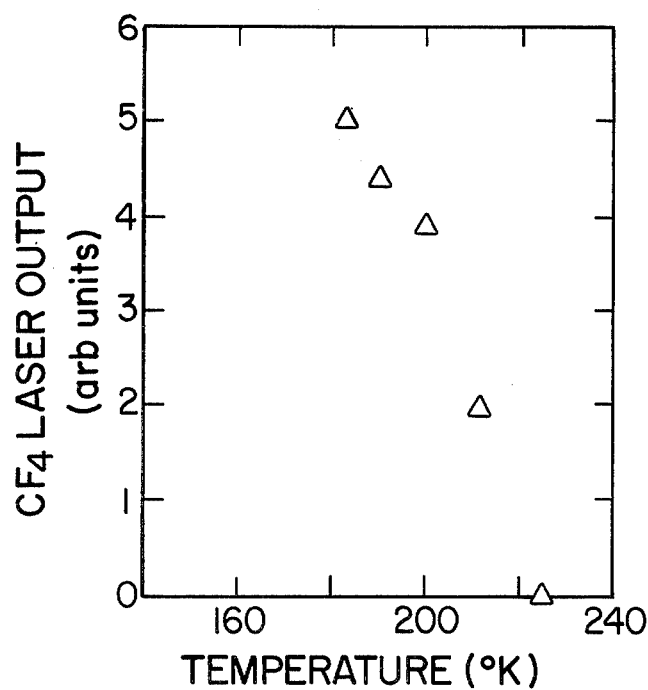
FIG. 3 is a table of $CF_4$ laser frequency lines obtained and corresponding experimental data.
FIG. 4 is a graph of experimental results of the $CF_4$ laser output at various gas temperatures.

FIG. 4 illustrates various $CF_4$ laser outputs within a range of cell temperatures. The minimum achievable cell temperature using liquid nitrogen boil off in a 350 cm cell has been 155° K. As the graph illustrates, it is important to cool the medium to produce greater outputs since the lower laser level is close to the ground state, i.e., approximately 435 cm$^{-1}$ for $CF_4$.

Optimum operating pressure differs for various $CF_4$ laser transitions, and is dependent to some extent on the magnitude of the pump energy. Experimental results show that the optimum lasing pressure increases with increasing pump energy. On stronger laser lines, the optimum operating pressure ranges from tenths of a torr to a few torr. Weaker laser lines tend to work well only at concentrations below 1 torr.

Pump thresholds for the $CF_4$ laser transitions are relatively high. This threshold level, however, is fairly hard to determine since the $CF_4$ laser output fluctuates dramatically from shot to shot at low pump inputs. This erratic behavior is due to the very narrow gain bandwidth of the 16 $\mu$m laser, i.e., 20 MH$_z$ FWHM, in comparison to the longitudinal mode spacing, i.e., 50 MH$_z$. Estimates of threshold pump energy are 150 mJ for stronger lines and 200–250 mJ for weaker lines.

The present invention therefore provides a method and device for producing near 16 $\mu$m radiation which is simple and efficient in operation. Since the absorption characteristics of the $\nu_2 + \nu_4$ vibrational states of the $CF_4$ gas fall within the near 9.5 $\mu$m wavelength region, a line tunable $CO_2$ laser can be utilized to excite the desired $\nu_2 + \nu_4$ vibrational quantum state. The transition $\nu_2 + \nu_4 \rightarrow \nu_2$ is enhanced by reducing cell temperatures and inducing oscillations of near 16 $\mu$m radiation in an optical resonant cavity. Output signal tunability is achieved by varying the input pump laser lines and cell temperature. In this manner, a wide range of output frequencies can be achieved.

Obviously many modifications and variations of the present invention are possible in light of the above teachings. For example, any line tunable pump laser could be used in the present device as an optical pumping source as long as it produces output signals falling within the absorption spectrum of the $CF_4$ gas such as shown in FIG. 2. Further, dichroic mirror 14 could be replaced with a total reflector, thereby eliminating total reflector 26 and filters 28. It is therefore to be understood that within the scope of the appended claims the invention may be practiced otherwise than as specifically described.

What we claim is:

1. A laser for producing near 16 $\mu$m coherent radiation comprising:
   line tunable $CO_2$ excitation means for emitting coherent radiation in the absorption spectrum of $CF_4$ molecular gas;
   an optically pumped cell aligned with said $CO_2$ excitation means;
   means for cooling said optically pumped cell;
   molecular $CF_4$ gas retained within said optically pumped cell;
   optical resonant cavity means surrounding said optically pumped cell such that said molecular $CF_4$ gas is optically pumped by said $CO_2$ excitation means to stimulate emission near 16 $\mu$m from the transition $\nu_2 + \nu_4 \rightarrow \nu_2$ of $CF_4$ molecular gas.

2. The laser of claim 1 wherein said means for cooling said optically pumped cell comprises a trough surrounding said cell containing liquid nitrogen for cryogenically cooling said molecular $CF_4$ gas.

3. A method for producing near 16 $\mu$m coherent radiation comprising:
   producing a coherent optical pumping signal from stimulated emission by a $CO_2$ laser having a frequency suitable for exciting the absorption spectrum of $CF_4$ molecular gas;
   irradiating an optically pumped cell containing said molecular $CF_4$ gas with said coherent optical pumping signal;
   forming an optical resonant cavity around said optically pumped cell suitable for stimulating emission of near 16 $\mu$m radiation.

4. The method of claim 3 wherein said step of producing a coherent optical pumping signal comprises producing a coherent optical pumping signal having wavelengths which range between approximately 9.2 $\mu$m and 9.6 $\mu$m.

5. An optically pumped laser comprising:
   an optically pumped cell containing molecular $CF_4$ gas;
   an optical resonant cavity aligned with said optically pumped cell for inducing oscillations of near 16 $\mu$m radiation;
   line tunable $CO_2$ laser means for optically pumping the $\nu_2 + \nu_4$ excitation level of said molecular $CF_4$ gas at wavelengths which range between approximately 9.2 $\mu$m and 9.6 $\mu$m to produce stimulated coherent radiation from the transition $\nu_2 + \nu_4 \rightarrow \nu_2$ of said molecular $CF_4$ gas.

6. The optically pumped laser of claim 5 further comprising means for cooling said molecular $CF_4$ gas in said optically pumped cell.

7. A $CF_4$ laser comprising:
   molecular $CF_4$ gas;
   $CO_2$ laser means for pumping the $\nu_2 + \nu_4$ excitation level of said molecular $CF_4$ gas;
   optical resonant means for inducing oscillations of near 16 $\mu$m laser radiation from the transition $\nu_2 + \nu_4 \rightarrow \nu_2$ in said molecular $CF_4$ gas to produce a near 16 $\mu$m laser signal.

8. The $CF_4$ laser of claim 7 further comprising means for cooling said molecular $CF_4$ gas.

* * * * *